(12) United States Patent
Nakatani et al.

(10) Patent No.: US 10,112,832 B2
(45) Date of Patent: Oct. 30, 2018

(54) OZONE GENERATOR

(71) Applicant: MITSUBISHI ELECTRIC CORPORATION, Chiyoda-ku, Tokyo (JP)

(72) Inventors: Hajime Nakatani, Tokyo (JP); Daisuke Takauchi, Tokyo (JP); Naoki Hiranabe, Tokyo (JP); Yoshiaki Odai, Tokyo (JP); Toshihiro Yoshida, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 110 days.

(21) Appl. No.: 15/325,814

(22) PCT Filed: Nov. 27, 2014

(86) PCT No.: PCT/JP2014/081316
§ 371 (c)(1),
(2) Date: Jan. 12, 2017

(87) PCT Pub. No.: WO2016/084181
PCT Pub. Date: Jun. 2, 2016

(65) Prior Publication Data
US 2017/0158507 A1 Jun. 8, 2017

(51) Int. Cl.
*C01B 13/11* (2006.01)

(52) U.S. Cl.
CPC ............ *C01B 13/11* (2013.01); *C01B 13/115* (2013.01); *C01B 2201/14* (2013.01); *C01B 2201/22* (2013.01)

(58) Field of Classification Search
None
See application file for complete search history.

(56) References Cited

U.S. PATENT DOCUMENTS 1,130,827 A 3/1915 Knox
5,698,164 A 12/1997 Kishioka et al.

FOREIGN PATENT DOCUMENTS

JP 07-330308 A 12/1995
JP 08-185955 A 7/1996
(Continued)

OTHER PUBLICATIONS

International Search Report (PCT/ISA/210) dated Feb. 17, 2015, by the Japanese Patent Office as the International Searching Authority for International Application No. PCT/JP2014/081316.
(Continued)

*Primary Examiner* — Kishor Mayekar
(74) *Attorney, Agent, or Firm* — Buchanan Ingersoll & Rooney PC (57) ABSTRACT

This invention aims at improving the reliability of the electrode in an ozone generator, and also at shortening the start-up time of the ozone generator after the maintenance. The ozone generator comprising; a dielectric discharge tube, having a closed end and an open end which are faced each other, and including an electrode formed on an inner surface thereof, a sealing lid, covering the open end of the dielectric discharge tube and fixed to the dielectric discharge tube with an adhesive, a power supply brush, in inscribed contact with the electrode formed on the inner surface of the dielectric discharge tube, and a grounding electrode, arranged concentrically with the dielectric discharge tube; wherein the sealing lid includes a main body part and a cylinder part, which are connected together, and an inside diameter of the cylinder part is larger than an outside diameter of the dielectric discharge tube.

8 Claims, 5 Drawing Sheets

(56) References Cited

FOREIGN PATENT DOCUMENTS

| | | |
|---|---|---|
| JP | H10-338503 A | 12/1998 |
| JP | 11-35303 A | 2/1999 |
| JP | 2007-145630 A | 6/2007 |
| JP | 2008-222495 A | 9/2008 |
| JP | 2013-049582 A | 3/2013 |
| JP | 2013-094711 A | 5/2013 |
| JP | 2014-101260 A | 6/2014 |

OTHER PUBLICATIONS

Written Opinion (PCT/ISA/237) dated Feb. 17, 2015, by the Japanese Patent Office as the International Searching Authority for International Application No. PCT/JP2014/081316.

Extended European Search Report dated May 2, 2018, issued by the European Patent Office in corresponding European Application No. 14907014.6. (9 pages).

OZONE GENERATOR

FIELD OF THE INVENTION

This invention relates to an ozone generator, and more particularly relates to an ozone generator which produces industrially ozonized gas used at a water treatment plant and the like.

BACKGROUND OF THE INVENTION

Ozonized gas contains a predetermined concentration of ozone. The ozonized gas is powerful in deodorizing and bactericidal effects, and is used at a water treatment plant and the like. Among methods for generating ozonized gas industrially, usually used is a method whereby a source gas is circulated in the micro space formed between an grounding electrode and a dielectric discharge tube, and a high frequency electric field is applied to the micro space, and then silent electric discharge is generated (for example, Patent Documents 1-7). Ozone is generated in the micro space from oxygen or a source gas containing some oxygen, by the electric discharge energy of the silent electric discharge. The grounding electrode is made up of a metal tube of stainless steel and others. The dielectric discharge tube consists of a cylindrical glass and the like, which includes a high voltage electrode inside. The high voltage electrode is a thin film, which is formed of metal, such as aluminum and the like, on the inner surface of the dielectric discharge tube, by thermal spraying and others. Generally, an ozone generator produces ozone at a higher efficiency, when the generator is operated at a high gas pressure. Accordingly, the grounding electrode, the dielectric discharge tube, and others are stored in a high pressure tank.

For example, in the ozone generator according to Patent Document 1, the high voltage electrode is a conductive thin film, which is made by using a method, such as coating of the conductive coating material. The dielectric discharge tube includes a left end which is sealed. The right end of the tube, which is arranged at an ozonized gas outflow side, has an open structure. The open end of the dielectric discharge tube is at the ozonized gas outflow side and sealed with a lid. The lid prevents the diffusion of the ozonized gas into the inner side of the dielectric discharge tube, and restrains the corrosion of the high voltage electrode by ozone. In the ozone generator according to Patent Document 2, a clearance gap between the dielectric discharge tube and the lid is sealed with fillers like adhesive cement and others, or is sealed with inorganic adhesive. In a low temperature plasma generator according to Patent Document 3, a rod like conductor (0.6-4.5 mm in diameter) is inserted into the inside of a ceramic dielectric body (1-5 mm in diameter) with a cylindrical conformation. The ceramic dielectric body and the rod like conductor are sealed at both ends, by fusion bonding with glass or joining with adhesives or other methods.

In the ozone generator according to Patent Document 4, the ozone generator is in a configuration where a dielectric discharge tube includes an open port at a source gas inflow side and a closed end at the opposing ozonized gas outflow side. A gas circulation plug is installed in the open end of the dielectric discharge tube, which is arranged at the source gas inflow side. A small hole is opened in the gas circulation plug. When the ozone generator makes an emergency stop, the source gas stops its flow. The ozone generated at a discharging space spreads into the source gas inflow side of the dielectric discharge tube. Only a small hole is opened in the gas circulation plug, and then, ozone does not intrude into the dielectric discharge tube. Moreover, since the small hole is provided in the gas circulation plug, an excessive pressure is not applied to the dielectric discharge tube at regular times. Accordingly, the ozone generator is high in the reliability of the dielectric discharge tube.

CITATION LIST

Patent Literature

Patent Document 1 JP H11-35303 A
Patent Document 2 JP 2014-101260 A
Patent Document 3 JP H8-185955 A
Patent Document 4 JP 2008-222495 A
Patent Document 5 JP 2013-49582 A
Patent Document 6 JP 2007-145630 A
Patent Document 7 JP H7-330308 A

SUMMARY OF THE INVENTION

Technical Problem

In the configuration having a tandem electrode according to Patent Document 1, a lid is inserted into a dielectric discharge tube. Usually, the dielectric discharge tube is made of glass tube, and the inside diameter and the outside diameter of the dielectric discharge tube have dimensional tolerance. A clearance gap of 0.1 mm or so never fails to exist between the dielectric discharge tube and the lid. As a result, ozone gas diffuses and intrudes inside the dielectric discharge tube through the clearance gap between the dielectric discharge tube and the lid. Accordingly, a thin film which constitutes the high voltage electrode is corroded in the long run.

Although the idea of sealing the clearance gap between a dielectric discharge tube and a lid with adhesives is indicated in Patent Document 2, concrete configuration fails to be disclosed. When the clearance gap between the dielectric discharge tube and the lid is filled with adhesives, cracks will be produced in the dielectric discharge tube in many cases. While the dielectric tube is constituted of ceramics in the configuration disclosed in Patent Document 3, a glass tube is usually used as the dielectric tube in the large sized ozone generator which is to be employed for industrial use. When the end portion of a glass tube and a central conductor are joined with adhesives, cracks may be produced in the glass tube.

In the configuration of the ozone generator according to Patent Document 4, a small hole is opened in the gas circulation plug. Maintenance of the ozone generator is performed, after the operation of a long period of time. When open inspections of the ozone generator are carried out, moisture or the like is introduced into the inside of the dielectric discharge tube. The moisture, which intruded once from the small hole, remains at the inside of the dielectric discharge tube. Even after the operation of the ozone generator is resumed, the moisture may gradually come through the small hole to outside of the dielectric discharge tube. Accordingly, the dew point of the source gas is high. A long time is necessary to recover the performance in ozone generation to its initial level.

This invention is made to solve the above indicated issues. This invention aims at improving the reliability of the electrode in an ozone generator, and also at shortening the start-up time of the ozone generator after the maintenance of the ozone generator is carried out.

Solution to Problem

An ozone generator according to the present invention comprises; a dielectric discharge tube, having a closed end and an open end which are faced each other, and including an electrode formed on an inner surface thereof, a sealing lid, covering the open end of the dielectric discharge tube and fixed to the dielectric discharge tube with an adhesive, a power supply brush, in inscribed contact with the electrode formed on the inner surface of the dielectric discharge tube, and a grounding electrode, arranged concentrically with the dielectric discharge tube; wherein the sealing lid includes a main body part and a cylinder part, which are connected together, and an inside diameter of the cylinder part is larger than an outside diameter of the dielectric discharge tube.

Advantageous Effects of Invention

According to the ozone generator of the present invention, it is possible to prevent cracks, clefts and the like from initiating in the dielectric discharge tube at the time of manufacturing and using the ozone generator. Moisture does not intrude into the inside of the dielectric discharge tube at the time of maintenance of the ozone generator. Accordingly, an effect can be realized that the start-up time of the ozone generator after the maintenance is shortened.

DESCRIPTION OF EMBODIMENTS

Hereinafter, ozone generators according to the embodiments of the present invention will be described with reference to drawings. Incidentally, the same reference numerals are given to those identical or similar to constitutional portions in respective drawings and the size and/or the scale size of the corresponding respective constitutional portions are respectively independent. For example, when the identical constitutional portions, which are not changed, are shown, the size and/or the scale size of the identical constitutional portions may different among sectional views in which a part of the configuration is changed. Furthermore, although the configurations of the ozone generator is further actually provided with a plurality of members, for ease of explanation, only portions necessary for explanation will be described and other portions are omitted.

Embodiment 1

Figure 1:
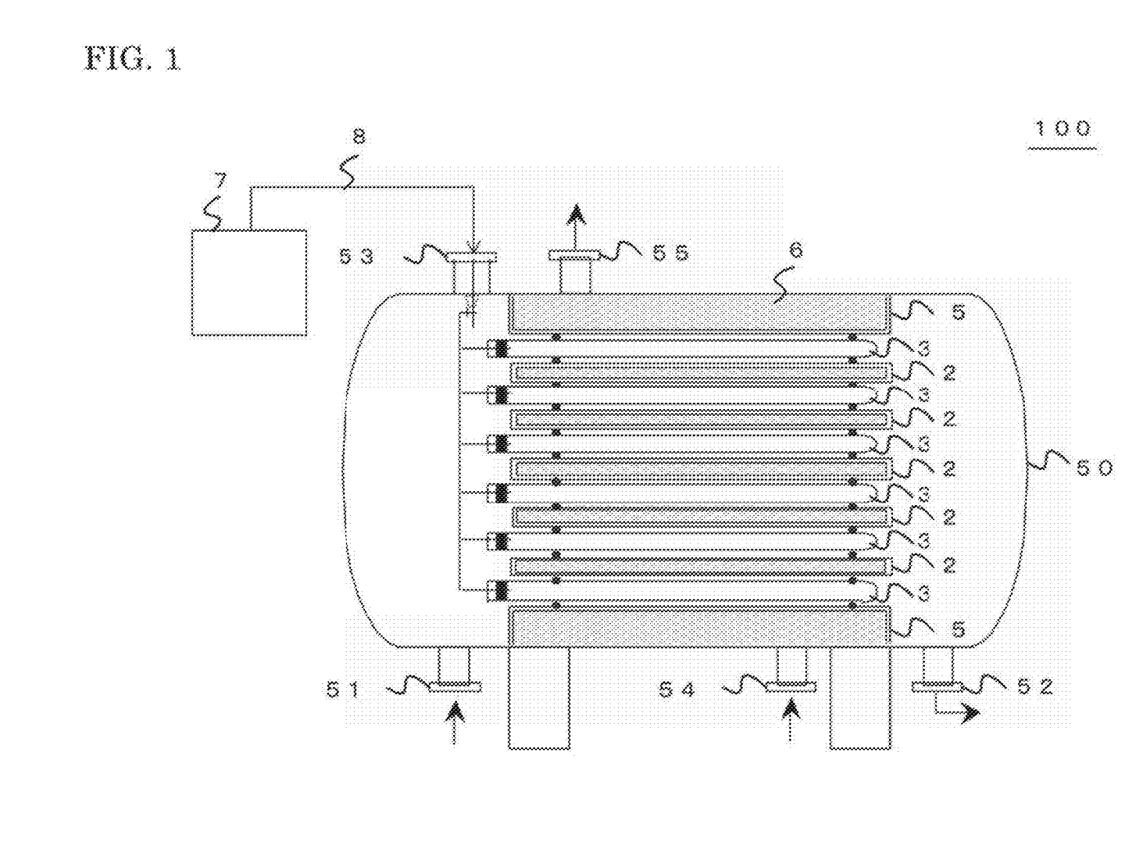
FIG. 1 is a cross sectional view illustrating an ozone generator according to embodiments of the present invention.

Hereinafter, the configuration of Embodiment 1 according to the present invention will be explained in reference to drawings. FIG. 1 is a view for showing the structure of an ozone generator 100 according to the embodiments of the present invention. A high pressure tank 50 is a container used at high pressure, and the outside view of the high pressure tank looks like a cylinder which is laid sideways. In order to introduce a high voltage wiring 8 from the high voltage power supply 7 into the tank, a high voltage line feed port 53 is provided at the upper left of the high pressure tank 50. Measures are taken in the high voltage line feed port 53 for fully insulating between the high voltage wiring 8 and the grounded high pressure tank 50, and further for preventing the leakage of gases. A source gas inlet 51 is established at the lower left of the high pressure tank 50, and the ozonized gas outlet 52 is established at the lower right of the high pressure tank 50, respectively.

Source gas, which is introduced from the source gas inlet 51, passes through the electric discharge space where silent electric discharge has been generated, and becomes ozonized gas containing ozone generated by the electric discharge, and is discharged from the ozonized gas outlet 52. The source gas is a gas which includes air or oxygen as a chief component. Cooling water 6 is supplied from the cooling water inlet 54, which is prepared below the high pressure tank 50, to the inside of the structural body 5, and is discharged from the cooling water outlet 55. A predetermined number of dielectric discharge tubes 3 and grounding electrodes 2 are arranged with necessary intervals in a structural body 5.

Figure 2:
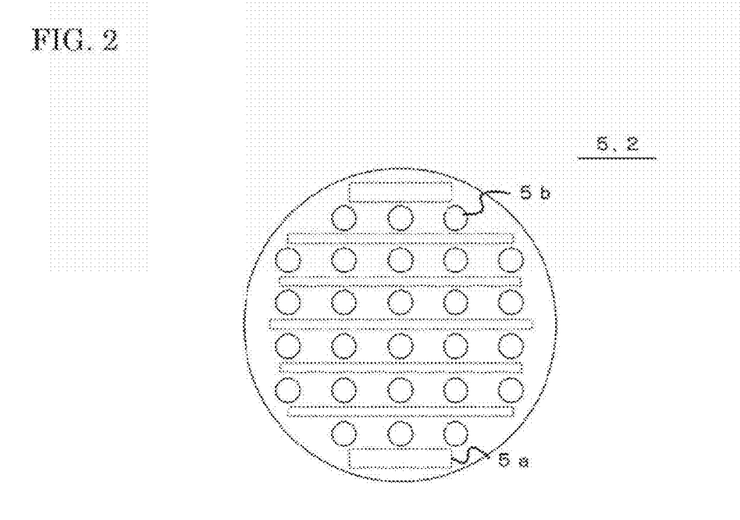
FIG. 2 is a structural and cross sectional drawing for showing a structural body of the ozone generator.

FIG. 2 is a sectional view for explaining the configuration of the structural body 5. The structural body 5 is circular in cross section and two or more waterways 5a and through holes 5b are prepared in an axial direction. A cylindrical dielectric discharge tube 3 is inserted into a through hole 5b. The through hole 5b constitutes an inner surface of the grounding electrode 2. The dielectric discharge tube 3 is arranged concentrically with the cylindrical grounding electrode 2, and gas passes through the inside of the grounding electrode 2. The structural body 5 can be sealed and the waterway 5a is filled up with cooling water 6 for cooling the grounding electrode 2.

Figure 3:
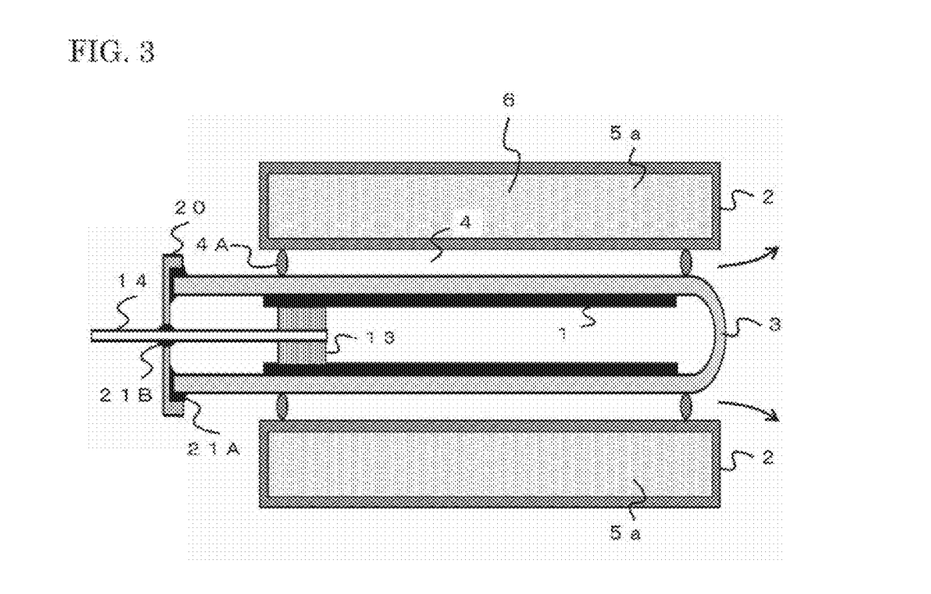
FIG. 3 is a structural and cross sectional drawing for showing the relation between a sealing lid and a dielectric discharge tube.

FIG. 3 is a drawing for explaining the configuration of the dielectric discharge tube, and is a sectional view, shown in a section parallel to the gas flow direction. The high voltage electrode 1 is an electrode which is formed on the inner surface of the dielectric discharge tube 3. The grounding electrode 2 consists of a metal tube, like a stainless steel tube and others. The dielectric discharge tube 3 and the grounding electrode 2 are both cylindrical in shape. The dielectric discharge tube 3 and the grounding electrode 2 are arranged so that they may be concentric each other. The space which is made between the dielectric discharge tube 3 and the grounding electrode 2 becomes an electric discharge space 4. In order to keep the section of the electric discharge space 4 in the shape of a unbiased doughnut, spacers 4A are provided in the positions near the both ends of the dielectric discharge tube 3. A power supply brush 13 is in inscribed contact with an electrode (high voltage electrode 1), which is formed on the inner surface of the dielectric discharge tube 3.

The cylindrical dielectric discharge tube 3, of which one end is closed, consists of glass and the like, and includes a high voltage electrode 1 formed on an inner surface thereof. The high voltage electrode 1 is also cylindrical in shape. The dielectric discharge tube 3 includes an open end which is arranged on the upper stream side of the source gas, in other words, from which the source gas flows in. A power supply rod 14 is connected to the high voltage electrode 1 via the power supply brush 13. The power supply rod 14 is connected to the high voltage wiring 8. The high voltage electrode 1 consists of a thin film and the like, containing at least one material selected from the material group which consists of chromium, gold, silver, copper, tin, zinc, nickel, carbon, and aluminum.

The open end and outer periphery of the dielectric discharge tube 3 is covered with a sealing lid 20. The adhesive 21A is applied to a clearance gap between the sealing lid 20 and the dielectric discharge tube 3, and the sealing lid 20 and the dielectric discharge tube 3 are fixed with and sealed with the adhesive. A hole is opened at the central part of the sealing lid 20, and the power supply rod 14 is arranged to pass through the hole. The adhesive 21B is applied between the hole at the central part of the sealing lid 20 and the power supply rod 14, and the hermetic bonding of the sealing lid 20 and the power supply rod 14 is performed. A glass tube used for the dielectric discharge tube 3 employs a DURAN (Registered Trademark), sold by SCHOTT AG. DURAN, a kind of borosilicate glass, is hard glass which includes 81% or more of $SiO_2$ and is excellent in chemical durability.

The dielectric discharge tube 3A employs a DURAN pipe, which is 10-30 mm in outside diameter and 0.8-1.6 mm in thickness. One end of the DURAN pipe is closed. Glass binder, which is excellent in ozone resistance and acid resistance, or cement adhesive, which is the mixture of epoxy resin and metal powders is used as the adhesives 21A, 21B. The glass binder used here includes, for example, CERAMBOND 569 of Audec Co., Ltd. and 940LE of Kanetuu Co., Ltd. and the like. As the cement adhesive including the mixture of epoxy resin and metal powders, employed are, for example, VeroMetal of DUR METAL COMPANY SRL and Devcon of Devcon, Inc. and the like.

Figure 4:
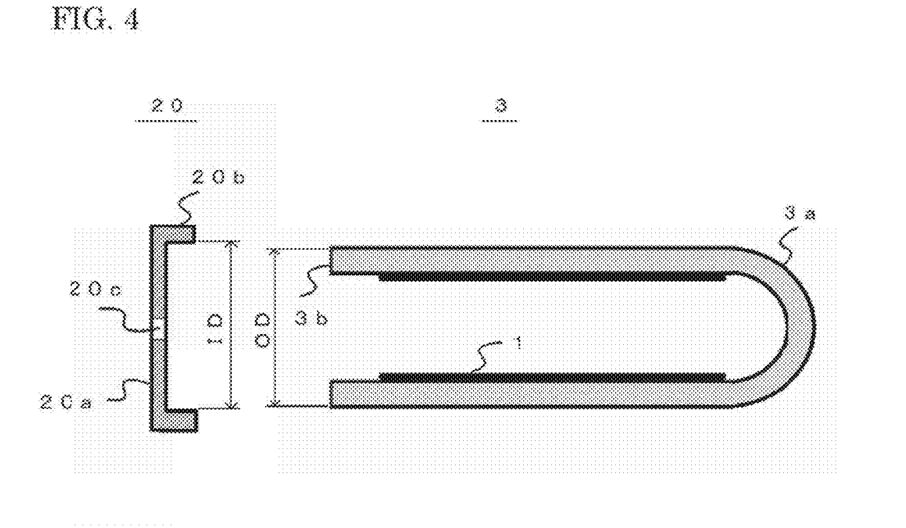
FIG. 4 is a structural and cross sectional drawing of a dielectric discharge tube for showing Embodiment 1 of the present invention.

FIG. 4 is a drawing for explaining the configuration of a sealing lid and a dielectric discharge tube. The sealing lid 20 has a main body part 20a and a cylinder part 20b. Both parts are connected and unified. An open port 20c is formed at the center of the disk like main body part 20a. The dielectric discharge tube 3 has a closed end 3a at one end and an open end 3b at the other end. An electrode (high voltage electrode 1) is formed on the inner surface of the dielectric discharge tube 3. The closed end 3a and the open end 3b face each other. The inside diameter (ID) of the cylinder part 20b of the sealing lid 20 is made larger than the outside diameter (OD) of the dielectric discharge tube 3, in order that the sealing lid 20 may take a configuration where a narrow clearance gap is formed on the outer periphery of the dielectric discharge tube 3. For example, the difference between the inside diameter of the cylinder part 20b of the sealing lid 20 and the outside diameter of the dielectric discharge tube 3 was from 0.3 mm to 2 mm. In order to raise seal performance, the adhesive 21A was applied also to the open end part of the dielectric discharge tube 3, to carry out hermetic bonding.

Austenite stainless steel, such as SUS304, SUS304L, SUS316, and SUS316L, is employed as material of the sealing lid 20. When aluminum was employed as the material of the sealing lid 20, cracks were formed in the dielectric discharge tube 3, because heat stress is generated in large quantity by the thermal expansion during the ozone generation. It is better to bond the sealing lid 20 on the outer periphery of the dielectric discharge tube 3. The dielectric discharge tube suffers stress in large quantity, if the sealing lid 20 is bonded on the inner side of the dielectric discharge tube 3, where a narrow clearance gap is constituted on the internal diameter side of the dielectric discharge tube. When stainless steel is used as the material of the sealing lid 20, and also when aluminum is used as the material of the sealing lid 20, cracks and chaps were formed in the dielectric discharge tube, at the stage where adhesive 21A was applied and hardened.

Next, how the ozone generator works is explained. High voltage with high frequency is supplied from the high voltage power supply 7 and applied to the high voltage electrode 1 via the high voltage wiring 8, the power supply rod 14, and the power supply brush 13. Silent electric discharge is generated in an electric discharge space 4, which is formed between the dielectric discharge tube 3 and the grounding electrode 2, and the source gas is changed into ozone gas. When the ozone generator 100 is operated, discharge extraneous matter will adhere to the surface of the grounding electrode 2 and the outer periphery of the dielectric discharge tube 3. Nitrogen oxide, such as $N_2O_5$, will be absorbed in this matter. If an ozone generator is operated for a long period of time, the discharge extraneous matter is piled up to accumulate on the surface of the grounding electrode 2 and the outer periphery of the dielectric discharge tube 3. If the discharge extraneous matter adheres in large quantities, the gas is hard to flow through the electric discharge space 4. In addition, efficiency in ozone generation decreases. Thereby, the ozone generator is maintained periodically.

The discharge extraneous matter is produced in larger quantities, when air is employed as a source gas. Accordingly, the maintenance of the ozone generator is carried out every one to five years, for example. The discharge extraneous matter is produced in lesser quantity, when the source gas is produced by oxygen generating equipment. Accordingly, the maintenance of the ozone generator is carried out every five to ten years, for example. When the ozone generator needs to be maintained, the ozone generator is thrown to open. The dielectric discharge tube is taken to the outside, and discharge extraneous matter attached to the outer periphery of the dielectric discharge tube is removed. When the discharge extraneous matter has stuck hardly to the outer periphery, water is used for cleaning in many cases. In the ozone generator 100 according to the present embodiment, the sealing lid 20 is attached to the open portion of the dielectric discharge tube 3. Accordingly, cleaning water does not intrude into the inside of the dielectric discharge tube 3.

When a clearance gap of 0.1 mm or so was formed between the lid and the dielectric discharge tube, moisture intruded into the inside of the dielectric discharge tube, at the time when the ozone generator was maintained. Even if source gas is introduced to pass through the dielectric discharge tube after the maintenance, moisture comes out gradually from the inside of the dielectric discharge tube. The source gas needed one week or so to recover to a normal value in dew point. Efficiency in ozone generation is low, when the dew point of the source gas is high. Accordingly, the performance of an ozone generator is not stabilized for one week or so. On the other hand, an ozone generator, which is constituted according the present embodiment, recovers the efficiency in ozone generation to a predetermined level, in a half day or so, after the maintenance of the generator. Thereby, an effect can be realized that the ozone generator is short in start-up time after the maintenance.

When air is employed as the source gas, the ozone generator is maintained at a short period cycle. Major inspection of the generator and cleaning of the dielectric discharge tube are carried out at the maintenance. Then, the present embodiment is profound in effect. Moreover, the same effect is realized also when the oxygen gas generating equipment is used as a gas source. Adhesive with ozone resistance was used for bonding agent. Accordingly, the adhesives are free from degradation and the connection part between the sealing lid and the dielectric discharge tube is high in reliability. Moreover, hermetic bonding was carried out at the clearance gap between the outer periphery of the dielectric discharge tube and the inner periphery of the sealing lid and furthermore, stainless steel was employed as a sealing lid. Thereby, neither cracks nor chaps are formed on the glass of the dielectric discharge tube, even if the ozone generator is placed at different temperatures.

In the present embodiment, although the material of the sealing lid 20 employs austenite stainless steel, it is obvious that a similar effect can be realized, even if other stainless materials are employed for the sealing lid 20. Moreover, the similar effect can be realized, even if the material of the sealing lid 20 employs ceramics, which is high in corrosion resistance to ozone or acid, instead of employing austenite stainless steel.

Embodiment 2

Figure 5:
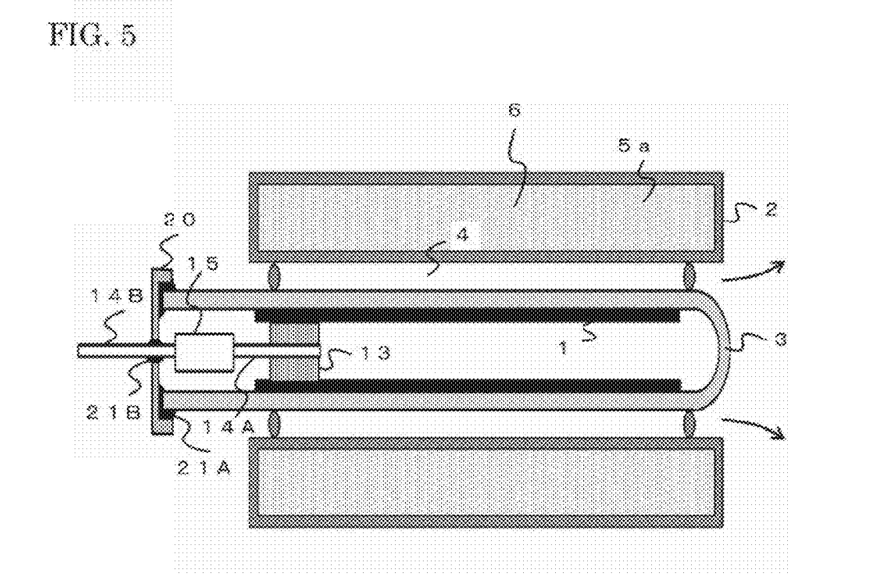
FIG. 5 is a structural and cross sectional drawing of a dielectric discharge tube for showing Embodiment 2 of the present invention.

In Embodiment 1, the high voltage electrode 1 is directly connected with the high voltage power supply 7. In Embodiment 2, as shown in FIG. 5, the high voltage electrode 1 is connected to the high voltage power supply 7, through a power supply brush 13, a power supply rod 14A, a fuse 15, a power supply rod 14B, and high voltage wiring 8. In a case where insulation breakdown or the like occurs at the dielectric discharge tube 3, a situation is created where excessive current flows into between the high voltage electrode 1 and the grounding electrode 2. In this case, the fuse 15 shuts off the excessive current immediately and separates the dielectric discharge tube 3 from an electric circuit.

The fuse 15 is arranged inside the dielectric discharge tube 3 and is sealed with the sealing lid 20. Conductor and insulator, which constitute a fuse, are kept from the exposure to cleaning water which contains nitric acid, at the time of the maintenance of the ozone generator 100. Thereby, it is not necessary to construct the conductor and the insulator, with acid resistant material. Moreover, a fuse is arranged. Accordingly, a short circuit current is intercepted with the fuse, even when any one of dielectric discharge tubes 3 breakdowns in insulation. It is possible to continue ozone generation only with other dielectric discharge tubes, which are inserted in the high pressure tank. Operation of the ozone generator can be continued without suspending the ozone generator.

Embodiment 3

Figure 6:
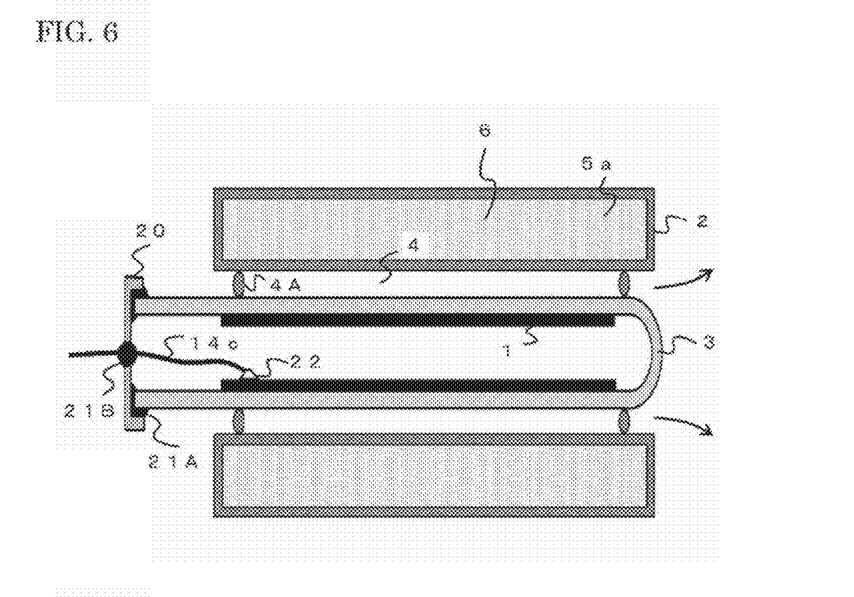
FIG. 6 is a structural and cross sectional drawing of a dielectric discharge tube for showing Embodiment 3 of the present invention.

In Embodiment 1, the power supply brush 13 is in contact with the high voltage electrode 1 and supplies electric power to the high voltage electrode. In Embodiment 3, as shown in FIG. 6, electric power is supplied to the high voltage electrode 1 by electrically connecting the power supply wire 14C to the high voltage electrode 1, with the solder 22.

Usually, solder cannot be used inside the high pressure tank 50, because solder is corroded by ozone or acid. However, in the ozone generator according to the present embodiments, the corrosion of solder does not progress, even if solder is used in the tank, because the inside of the dielectric discharge tube is sealed with the sealing lid 20. The rise in temperature can be kept low in the case of electrically connecting the high voltage electrode 1 with the power supply wire 14C, especially if low temperature solder is used for the solder 22. Thereby, a DURAN pipe used for the dielectric discharge tube 3 does not break up with heat, when the electrical jointing is carried out. Compared with Embodiment 1, the power supply wire 14C can be far more surely connected with the high voltage electrode 1, which is arranged in the dielectric discharge tube 3.

Embodiment 4

Figure 7:
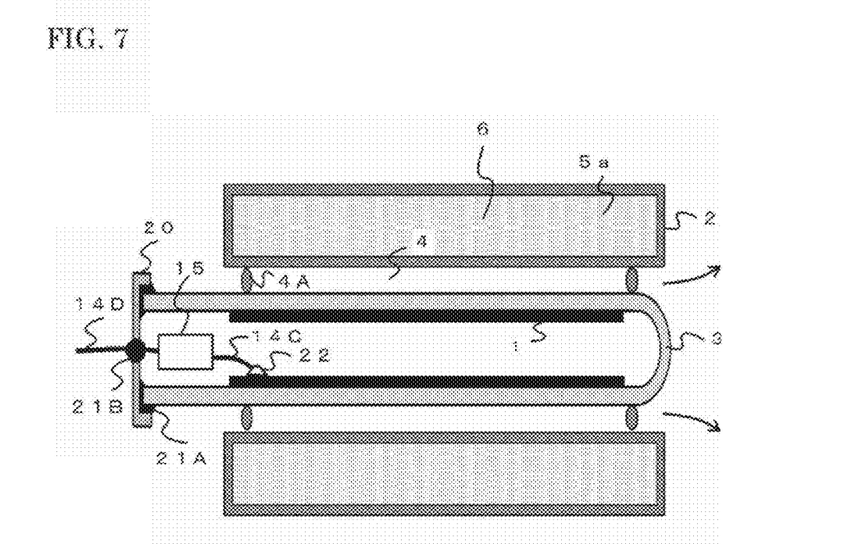
FIG. 7 is a structural and cross sectional drawing of a dielectric discharge tube for showing Embodiment 4 of the present invention.

In Embodiment 3, the power supply wire 14C is directly connected to the high voltage electrode 1, which is arranged inside a dielectric discharge tube. In Embodiment 4, as shown in FIG. 7, a fuse 15 is connected between the power supply wire 14C and the power supply wire 14D. Moreover, the power supply wire 14C and the high voltage electrode 1 are electrically connected with the solder 22. A terminal line which is included in the fuse 15 can be used as the power supply wires 14C and 14D, as it is. Accordingly, components of the generator do not increase in number. Even when the fuse 15 includes no terminal line, the power supply wire 14C, the power supply wire 14D, and the fuse 15 can be the electrically joined with the solder 22. Therefore, the reliability of electrical connectivity is improved.

Embodiment 5

Figure 8:
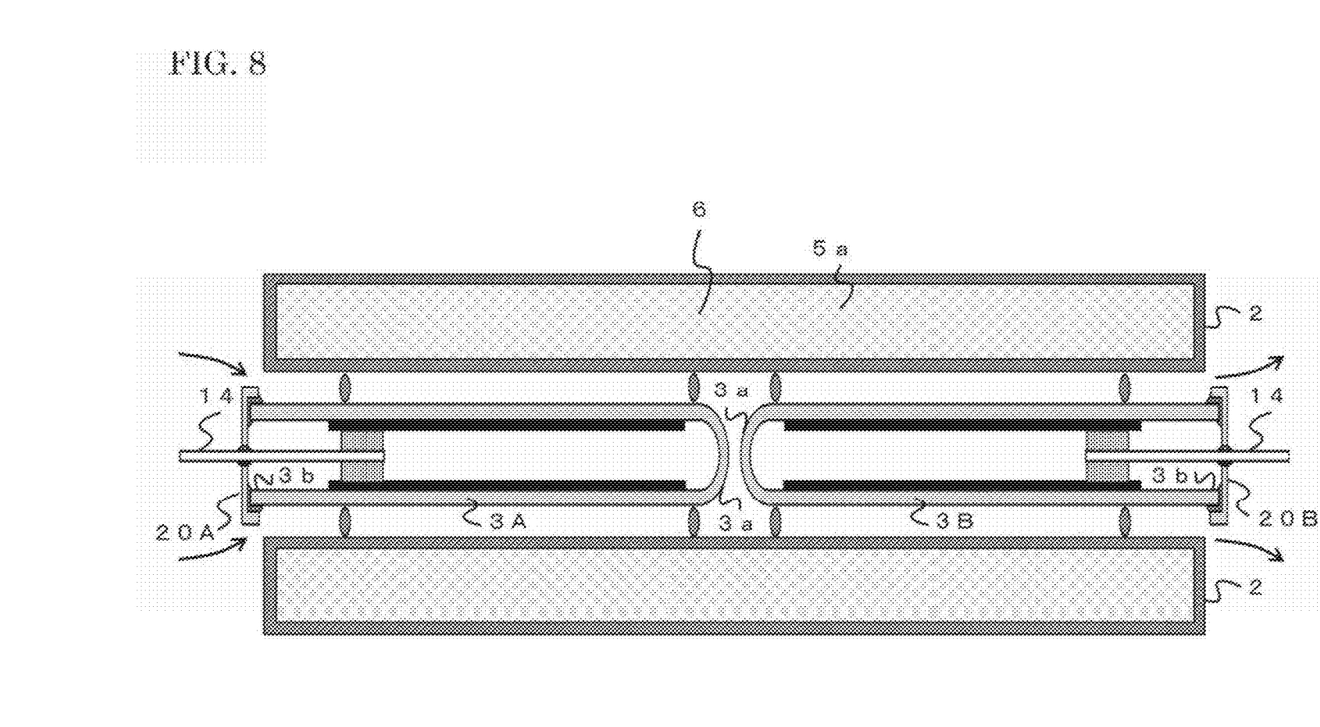
FIG. 8 is a structural and cross sectional drawing of a dielectric discharge tube for showing Embodiment 5 of the present invention.

In Embodiment 1, only one dielectric discharge tube 3 was used in the gas flow direction. In Embodiment 5, as shown in FIG. 8, two dielectric discharge tubes, which are so called in tandem arrangement, are used. Each of the dielectric discharge tubes is installed in the grounding electrode 2 along the lengthy direction thereof, with the seal sides of the discharge tubes standing at the central part of the electrode face to face. The open portion (open end 3b) of a dielectric discharge tube 3A (first dielectric discharge tube) is arranged at the source gas inflow side. Moreover, the open portion (open end 3b) of a dielectric discharge tube 3B (second dielectric discharge tube) is arranged at the ozonized gas outflow side. A sealing lid 20A (first sealing lid) covers the open end 3b of the dielectric discharge tube 3A. A sealing lid 20B (second sealing lid) covers the open end 3b of the dielectric discharge tube 3B.

The dielectric discharge tube 3A and the dielectric discharge tube 3B are arranged to include the closed ends 3a, which are faced each other. The inside diameter of the cylinder part of the sealing lid 20A is larger than the outside diameter of the dielectric discharge tube 3A. The inside diameter of the cylinder part of the sealing lid 20B is larger than the outside diameter of the dielectric discharge tube 3B. The open end 3b of the dielectric discharge tube 3A is sealed with the sealing lid 20A and the adhesives 21A, 21B. The open end 3b of the dielectric discharge tube 3B is sealed with the sealing lid 20B and the adhesives 21A, 21B.

At the time when the ozone generator is in operation, highly concentrated ozone gas is present at the ozonized gas outflow side. The ozone gas does not intrude into the dielectric discharge tube 3B, if the ozone generator is in the present configuration. For this reason, the degradation by corrosion does not occur in the dielectric discharge tube 3A and the dielectric discharge tube 3B, even if versatile material is used as the high voltage electrode 1, and moreover, even if a thinner film is formed on the electrode. An example of the thinner film electrode can employ a metal film containing at least one material selected from the material group which consists of chromium, gold, silver, copper, tin, zinc, nickel, carbon, and aluminum. If a high voltage electrode is constituted with the metal film, an ozone generator with high reliability can be offered.

It should be noted that each embodiment of the present invention may be freely combined, or appropriately modified or omitted within the spirit and scope of the invention.

EXPLANATION OF NUMERALS AND SYMBOLS

1 High voltage Electrode; 2 Grounding electrode; 3 Dielectric Discharge Tube; 3a Closed End; 3b Open End; 4 Electric Discharge Space; 4A Spacer; 5 Structural Body; 5a Waterway, 5b Through hole; 6 Cooling water; 7 High voltage power supply; 8 High voltage wiring; 13 Power supply brush; 14 Power supply rod; 14C Power supply wire; 15 Fuse; 20 Sealing lid; 20a Main body part; 20b Cylinder part; 20c Open port; 21 Adhesive; 21B Adhesive; 22 Solder; 50 High pressure tank; 51 Source gas inlet; 52 Ozonized gas outlet; 53 High voltage line feed port; 54 Cooling water inlet; 55 Cooling water outlet; 100 Ozone generator.

What is claimed is:

1. An ozone generator comprising;
a dielectric discharge tube, consisting of a glass tube, having a closed end and an open end, and including an electrode formed on an inner surface thereof,
a sealing lid, consisting of stainless steel or ceramics, covering the open end of the dielectric discharge tube and fixed to the dielectric discharge tube with an adhesive,
a power supply brush, in inscribed contact with the electrode formed on the inner surface of the dielectric discharge tube, and
a grounding electrode, arranged concentrically with the dielectric discharge tube;
wherein the sealing lid includes a main body part and a cylinder part, which are connected together, and
an inside diameter of the cylinder part is larger than an outside diameter of the dielectric discharge tube.

2. The ozone generator as set forth in claim 1, wherein a fuse is arranged between the power supply brush and the sealing lid.

3. The ozone generator as set forth in claim 1, wherein a power supply rod is inserted through an opening which is formed in the main body part, and the power supply rod and the sealing lid are sealed with an adhesive.

4. An ozone generator comprising;
a dielectric discharge tube, consisting of a glass tube, having a closed end and an open end, and including an electrode formed on an inner surface thereof,
a sealing lid, consisting of stainless steel or ceramics, covering the open end of the dielectric discharge tube and fixed to the dielectric discharge tube with an adhesive,
a power supply wire, being soldered with the electrode formed on the inner surface of the dielectric discharge tube, and
a grounding electrode, arranged concentrically with the dielectric discharge tube;
wherein the sealing lid includes a main body part and a cylinder part, which are connected together, and
an inside diameter of the cylinder part is larger than an outside diameter of the dielectric discharge tube.

5. The ozone generator as set forth in claim 4, wherein a fuse is arranged between the power supply wire and the sealing lid.

6. The ozone generator as set forth in claim 4, wherein the power supply wire is inserted through an opening which is formed in the main body part, and the power supply wire and the sealing lid are sealed with an adhesive.

7. An ozone generator comprising;
a first dielectric discharge tube, consisting of a glass tube, having a closed end and an open end, and including an electrode formed on an inner surface thereof,
a first sealing lid, consisting of stainless steel or ceramics, including a main body part and a cylinder part which are connected each other, covering the open end of the first dielectric discharge tube and fixed to the first dielectric discharge tube with an adhesive,
a second dielectric discharge tube, consisting of a glass tube, having a closed end and an open end, and including an electrode formed on an inner surface thereof,
a second sealing lid, consisting of stainless steel or ceramics, including a main body part and a cylinder part which are connected each other, covering the open end of the second dielectric discharge tube and fixed to the second dielectric discharge tube with an adhesive, and
a grounding electrode, arranged concentrically with the first dielectric discharge tube and the second dielectric discharge tube;
wherein
the first dielectric discharge tube and the second dielectric discharge tube are arranged to include the closed ends facing each other,
an inside diameter of the cylinder part of the first sealing lid is larger than an outside diameter of the first dielectric discharge tube, and
an inside diameter of the cylinder part of the second sealing lid is larger than an outside diameter of the second dielectric discharge tube.

8. The ozone generator as set forth in claim 7, wherein a first power supply rod is inserted through an opening which is formed in the main body part of the first sealing lid, a second power supply rod is inserted through an opening which is formed in the main body part of the second sealing lid, the first power supply rod and the first sealing lid are sealed with an adhesive, and the second power supply rod and the second sealing lid are sealed with an adhesive.

* * * * *